(12) United States Patent  (10) Patent No.: US 8,599,841 B1
Sriram  (45) Date of Patent: Dec. 3, 2013

(54) MULTI-FORMAT BITSTREAM DECODING ENGINE (75) Inventor: Parthasarathy Sriram, Los Altos, CA (US)

(73) Assignee: Nvidia Corporation, Santa Clara, CA (US)

( * ) Notice: Subject to any disclaimer, the term of this patent is extended or adjusted under 35 U.S.C. 154(b) by 630 days.

(21) Appl. No.: 11/392,095

(22) Filed: Mar. 28, 2006

(51) Int. Cl.
 H04L 12/28 (2006.01)
 H04L 12/50 (2006.01)
 H04N 7/12 (2006.01)
 H04N 11/02 (2006.01)

(52) U.S. Cl.
 USPC .. 370/389; 370/357; 375/240.13; 375/240.16

(58) Field of Classification Search
 USPC ............... 370/357–395; 341/50–67, 79–167; 375/240.16–240.23, 240.26–240.27, 375/240–255, 240.13, 240.25; 382/232–281; 709/242–247
 See application file for complete search history.

(56) References Cited

U.S. PATENT DOCUMENTS

| | | | |
|---|---|---|---|
| 5,585,931 A | 12/1996 | Juri et al. | |
| 5,714,950 A | 2/1998 | Jeong et al. | |
| 5,742,342 A | 4/1998 | Jung | |
| 5,751,232 A | 5/1998 | Inoue et al. | |
| 5,818,529 A | 10/1998 | Asamura et al. | |
| 5,831,557 A * | 11/1998 | Handley | 341/67 |
| 5,831,616 A | 11/1998 | Lee | |
| 5,848,194 A | 12/1998 | Ishizuka et al. | |
| 5,883,671 A * | 3/1999 | Keng et al. | 375/240.1 |
| 5,883,823 A | 3/1999 | Ding | |
| 5,990,812 A | 11/1999 | Bakhmutsky | |
| 6,008,745 A | 12/1999 | Zandi et al. | |
| 6,009,203 A * | 12/1999 | Liu et al. | 382/233 |
| 6,041,403 A | 3/2000 | Parker et al. | |
| 6,047,357 A | 4/2000 | Bannon et al. | |
| 6,072,548 A * | 6/2000 | Schoner et al. | 375/240.26 |
| 6,081,783 A * | 6/2000 | Divine et al. | 704/500 |
| 6,151,359 A * | 11/2000 | Acer et al. | 375/240.28 |
| 6,157,396 A * | 12/2000 | Margulis et al. | 345/506 |
| 6,198,773 B1 * | 3/2001 | Gill et al. | 375/240.26 |

(Continued)

FOREIGN PATENT DOCUMENTS

CN 101017574 8/2007
EP 0463721 1/1992

(Continued)

OTHER PUBLICATIONS

Lee, W., et al., "MPEG-2 Decoder Implementation on MAP-1000A Media Processor Using the C Language," Proc. SPIE: Media Processors 2000, International Soc. for Optical Engineering (Bellingham, Washington), p. 27-36.

(Continued)

*Primary Examiner* — Man Phan (57) ABSTRACT

Configurable bitstream engines are described that can operate to decode variable length decoding of video and audio bitstreams encoded using any of a plurality of encoding schemes. Systems and methods are described that allow functional components of a bitstream engine to be disabled, enabled and configured as necessitated by the encoding scheme used to encode a bitstream. Functional components of a bitstream engine can perform single actions and operations, repetitive actions and operations and sequences of actions and operations as desired. A bit field extraction process is described for extracting bit fields of specified length from memory, updating bit offsets, loading new data from memory when needed.

24 Claims, 6 Drawing Sheets

(56) References Cited

U.S. PATENT DOCUMENTS

| | | | |
|---|---|---|---|
| 6,222,467 B1* | 4/2001 | Moon | 341/82 |
| 6,259,741 B1 | 7/2001 | Chen et al. | |
| 6,426,975 B1 | 7/2002 | Nishi et al. | |
| 6,442,206 B1 | 8/2002 | Hrusecky | |
| 6,456,340 B1* | 9/2002 | Margulis | 348/745 |
| 6,459,738 B1* | 10/2002 | Wu et al. | 375/240.27 |
| 6,504,496 B1* | 1/2003 | Mesarovic et al. | 341/106 |
| 6,535,642 B1 | 3/2003 | De Bonet | |
| 6,543,023 B2 | 4/2003 | Bessios | |
| 6,546,145 B1 | 4/2003 | Miyake et al. | |
| 6,587,057 B2* | 7/2003 | Scheuermann | 341/67 |
| 6,618,440 B1 | 9/2003 | Taunton | |
| 6,647,061 B1 | 11/2003 | Panusopone et al. | |
| 6,675,282 B2 | 1/2004 | Ham et al. | |
| 6,738,884 B1 | 5/2004 | Greicar | |
| 6,775,414 B1* | 8/2004 | Fogg et al. | 382/246 |
| 6,799,192 B1 | 9/2004 | Handley | |
| 6,839,624 B1 | 1/2005 | Beesley et al. | |
| 6,903,669 B1* | 6/2005 | Subramaniam | 341/106 |
| 6,992,605 B2 | 1/2006 | Kadono et al. | |
| 7,046,175 B1* | 5/2006 | Subramaniam | 341/106 |
| 7,095,344 B2 | 8/2006 | Sekiguchi et al. | |
| 7,095,896 B2 | 8/2006 | Abe et al. | |
| 7,100,017 B2 | 8/2006 | Greicar | |
| 7,109,898 B2 | 9/2006 | Kadono et al. | |
| 7,113,115 B2* | 9/2006 | Partiwala et al. | 341/67 |
| 7,129,862 B1* | 10/2006 | Shirdhonkar et al. | 341/67 |
| 7,132,963 B2* | 11/2006 | Pearlstein et al. | 341/67 |
| 7,161,508 B2 | 1/2007 | Kadono et al. | |
| 7,283,589 B2* | 10/2007 | Cai et al. | 375/240.26 |
| 7,286,066 B1* | 10/2007 | Ho et al. | 341/67 |
| 7,289,047 B2* | 10/2007 | Nagori | 341/67 |
| 7,324,026 B2 | 1/2008 | Puri et al. | |
| 7,348,902 B2* | 3/2008 | Pisarevsky et al. | 341/67 |
| 7,366,240 B2* | 4/2008 | Chiang Wei Yin et al. | 375/240.26 |
| 7,372,378 B2 | 5/2008 | Sriram | |
| 7,372,379 B1 | 5/2008 | Jia et al. | |
| 7,404,645 B2* | 7/2008 | Margulis | 353/31 |
| 7,447,266 B2 | 11/2008 | Yamashita et al. | |
| 7,480,418 B2* | 1/2009 | Niemi et al. | 382/246 |
| 7,496,234 B2* | 2/2009 | Li | 382/232 |
| 7,538,783 B2 | 5/2009 | MacInnis et al. | |
| 7,598,962 B2 | 10/2009 | MacInnis et al. | |
| 7,605,725 B2 | 10/2009 | Puri et al. | |
| 7,660,352 B2* | 2/2010 | Yamane et al. | 375/240.12 |
| 7,681,013 B1* | 3/2010 | Trivedi et al. | 712/7 |
| 7,884,742 B2 | 2/2011 | Puri et al. | |
| 2001/0030615 A1 | 10/2001 | Zhou | |
| 2002/0063807 A1* | 5/2002 | Margulis | 348/745 |
| 2002/0181794 A1 | 12/2002 | Lee | |
| 2003/0014241 A1 | 1/2003 | Ferris et al. | |
| 2003/0078952 A1 | 4/2003 | Kim et al. | |
| 2003/0079222 A1 | 4/2003 | Boykin et al. | |
| 2004/0057522 A1* | 3/2004 | Wu et al. | 375/240.26 |
| 2004/0081245 A1 | 4/2004 | Deeley et al. | |
| 2004/0158719 A1 | 8/2004 | Lee et al. | |
| 2004/0264565 A1 | 12/2004 | MacInnis | |
| 2005/0015248 A1 | 1/2005 | Kadono et al. | |
| 2005/0018796 A1 | 1/2005 | Sande et al. | |
| 2005/0033788 A1 | 2/2005 | Handley | |
| 2005/0117056 A1 | 6/2005 | Aprea et al. | |
| 2005/0229231 A1 | 10/2005 | Lippincott | |
| 2005/0254583 A1 | 11/2005 | Kim et al. | |
| 2006/0002475 A1 | 1/2006 | Fuchs | |
| 2006/0023789 A1 | 2/2006 | Yamashita et al. | |
| 2006/0064560 A1 | 3/2006 | Mizuno et al. | |
| 2006/0067582 A1* | 3/2006 | Bi et al. | 382/233 |
| 2006/0071829 A1 | 4/2006 | Pearlstein et al. | |
| 2006/0176960 A1* | 8/2006 | Lu et al. | 375/240.23 |
| 2007/0061522 A1 | 3/2007 | Vink | |
| 2007/0065027 A1 | 3/2007 | Boon et al. | |
| 2007/0126608 A1 | 6/2007 | Sriram | |
| 2008/0005736 A1 | 1/2008 | Apacible et al. | |
| 2008/0218387 A1 | 9/2008 | Chang et al. | |
| 2009/0103824 A1* | 4/2009 | Niemi et al. | 382/246 |
| 2009/0196356 A1* | 8/2009 | Houki | 375/240.25 |
| 2009/0198753 A1 | 8/2009 | Touimi | |

FOREIGN PATENT DOCUMENTS

| | | |
|---|---|---|
| EP | 0971546 | 1/2000 |
| JP | 11096138 A | 4/1999 |
| TW | 200428879 | 2/1993 |
| TW | 200520535 | 4/1993 |
| WO | 2004102971 | 11/2004 |
| WO | 2006008961 | 1/2006 |

OTHER PUBLICATIONS

Nikara, J., et al., "Parallel Multiple-Symbol Variable-Length Decoding," Pro. of 2002 IEEE Intl Conf on Comp. Design: VLSI in Comp Processors, IEEE, p. 1-6, (May 19, 2002).

Texas Instruments, "TMS320C6411 Fixed Point Digital Signal Processor Datasheet", May 19, 2006, http://focus.ti.com/docs/prod/folders/print/tms320c6411.html.

ARM, "ARM926EJ-S Jazelle Enhanced Macrocell", May 19, 2006, http://www.arm.com/products/CPUs/ARM926EJ-S.html.

The Moving Picture Experts (MPEG), "MPEG Standards", May 19, 2006, http://www.chiariglione.org/mpeg/standards.htm.

Abdellatif Benjelloun, Touimi et al. "Efficient Conversion Method Between Subband Domain Representations", Jul. 2005, IEEE, p. 1-4, Speech and Sound Technologies and Processing Lab, France Telecom Research & Development.

Madisetti, Vijay K. The Digital Processing Handbook, CRC Press LLC., 1998, Chapters 37 & 40, pp. 37-2, 37-3, 37-4, 40-6, 40-10, 40-12, 40-13, 40-15, 40-16.

Rohini Krishnan; et al., "Design of a 2D DCT/IDCT Application Specific VLIW Processor Supporting Scaled and Sub-sampled Blocks," 16th International Conference on VLSI Design, 2003, Six Pages.

English Translation of Office Action for Chinese Patent Application No. 200810212373.X, Entitled: Decoding Variable Length Codes in JPEG Applications.

Miska Hanniksela, Picture Decoding Method, USPTO Provisional Application filed Feb. 18, 2003; U.S. Appl. No. 60/448,189.

Ting-Kun Yeh et al., Video Decoder, USPTO Provisional Application filed Dec. 3, 2003; U.S. Appl. No. 60/526,294.

* cited by examiner

| Config. & control (42) | Size | Scan Bits (400) | Read Bits (401) | Flush Bits (402) | Scan Bits with Zero Run (403) | Read Bits with Zero Run (404) | Scan Bits with Zero Run Lookup (405) | Read Bits with Zero Run Lookup (406) | Scan Bits With Zero Run Lookup Post Scan Lookup (407) | Read Bits With Zero Run Lookup Post Scan Lookup (408) | Read Bits With Zero Run Lookup Post Read Lookup (409) |
|---|---|---|---|---|---|---|---|---|---|---|---|
| pfetch_bits (352) | 1-6 | n | n | n | n | n | n | n | n | n | n |
| scan_enb (354) | 1 | 1 | 1 | 0 | 1 | 1 | 1 | 1 | 1 | 1 | 1 |
| run_det_enb (356) | 1 | 0 | 0 | N/A | 1 | 1 | 1 | 1 | 1 | 1 | 1 |
| zero_run (358) | 1 | N/A | N/A | N/A | 0/1 | 0/1 | 0/1 | 0/1 | 0/1 | 0/1 | 0/1 |
| prim_look_enb (364) | 1 | 0 | N/A | N/A | 0 | 0 | 1 | 1 | 1 | 1 | 1 |
| prim_tab_elem (362) | 32x4 bytes | N/A | N/A | N/A | N/A | N/A | pointer | pointer | pointer | pointer | pointer |
| sec_look_enb (368) | 1 | 0 | N/A | N/A | N/A | N/A | N/A | N/A | 1 | 1 | 1 |
| sec_look_ptr (366) | 32-bits | N/A | N/A | N/A | N/A | N/A | N/A | N/A | pointer | pointer | pointer |
| eob_esc_codes (370) | 2x16 bits | N/A | N/A | N/A | N/A | N/A | N/A | N/A | 0/1 | 0/1 | 0/1 |
| eob_enb (386) | 1 | 0 | N/A | N/A | N/A | N/A | N/A | N/A | 0/1 | 0/1 | 0/1 |
| esc_enb (388) | 1 | 0 | N/A | N/A | N/A | N/A | N/A | N/A | 0/1 | 0/1 | 0/1 |
| sign_enb (380) | 1 | 0 | N/A | N/A | N/A | N/A | N/A | N/A | 0/1 | 0/1 | 0/1 |
| pscan_upd_enb (376) | 1 | 0 | N/A | N/A | 0 | N/A | 0 | 0 | 0 | 0 | 0 |
| ldz_upd_enb (374) | 1 | 0 | 1 | N/A | 0 | 1 | 0 | 1 | N/A | 1 | 1 |
| flush_len (372) | 6 | N/A | pfetch_bits | pfetch_bits | N/A | Zero run+1 | N/A | Zero_run+1 | N/A | 0-32 | 0-32 |

BSE Commands (40)

Figure 5a: ReadBits, ((bitOffset+len) ≤ 32)

Figure 5b: *ReadBits*, (bitOffset+len) >32)

Figure 6

MULTI-FORMAT BITSTREAM DECODING ENGINE

BACKGROUND OF THE INVENTION

1. Field of the Invention

The present invention generally relates to variable length decoding. More particularly, the present invention relates to bit-stream extraction in audio, imaging and video decompression applications.

2. Description of Related Art

Most existing techniques either offer a single-format variable length decoding engine or include a simple programmable engine that does most of the computations in software. The efficiency of the programmable engine is also limited because it typically provides acceleration only for the bit stream extraction portions of the problem.

Bit-field extraction is a critical part of several of image, video and audio decompression algorithms which use Huffman coding techniques to encode variables in the bitstreams. In Huffman coding based schemes, code words which occur very frequently are represented using shorter length bit fields while infrequent code words are represented using longer length bit fields. When the average bit rate is high (greater than 1 Mbits/sec), the number of times such variable length decoding (VLD) is done each second becomes very high. For example, for a bitstream at 8 Mbits/sec, assuming an average number of bits per field is 4, we need to decode 2 Mfields/sec. That is, for every cycle spent to decode such fields in software an extra 2 MIPS is required. For example, in a conventional MPEG-4 video decoder implemented on ARM7TDMI, approximately 50 cycles/field is required for VLD and Inverse Quantization. Consequently, decoding at 8 Mbits/sec would consume 100 MIPS which significantly exceeds the capabilities of current ARM7TDMI processor.

Conventional software engines of the use specific instructions to accelerate bit processing. For example, ARM processors have a count leading zero (CLZ) instruction for bit handling[1]. In another example, programmable DSP processors such as the Texas Instruments TI C64x have instructions such as Bit Field Extract, Set and Clear to handle bit processing[2]. Processors such as Equator's BSP16 have a dedicated 16-bit RISC engine to offload bit processing functions from the main CPU. This bit engine is fully software programmable in C. Methods conventionally used in bitstream decoding are taught by W. Lee, and C. Basoglu, "MPEG-2 Decoder Implementation on MAP-CA Media Processor Using the C Language," *Proc. SPIE: Media Processors* 2000, vol. 3970, Int'l Soc. for Optical Eng., Bellingham, Wash., 2000, pp. 27-36. While these approaches may provide some benefit by accelerating bit processing functions, the same inherent restrictions remain. In particular, such engines are not very good at processing bit streams that include varieties of HuffmanNariable length decoding. In addition, these engines are wasteful of processing power on simple calculations and lookups.

[1] See, e.g., http://www.arm.com/products/CPUs/ARM926EJ-S.html
[2] See, e.g., http://focus.ti.com/docs/prod/folders/print/tms320c6411.html Philips's Trimedia processors added a bit-streamNLD engine that accelerated MPEG-1/MPEG-2 video standards. However, this product had limited functionality and cannot be used to handle most encoding schemes. There are several examples in the industry that have taken this approach. Hence, there are no known bit stream engines that can handle variety of audio and video formats and provide a flexibility of programmability.

Parallel multiple-symbol VLD systems have been implemented[3]. However, such systems implement VLD processing in a standard specific way and can address only 1 or 2 where substantial similarity exists between standards. The resulting systems are inflexible and cannot handle other existing or newly defined standards.

BRIEF SUMMARY OF THE INVENTION

Embodiments of the present invention overcome limitations of conventional decoding systems and employ efficient systems and methods for variable length decoding of video and audio bitstreams encoded using schemes including MPEG-1, MPEG-2, MPEG-4, WMV9, H.264, JPEG, MP3, AAC and WMA[4]. Configurable bitstream engines are provided that can operate in a plurality of modes including hardware acceleration mode and hardware assist mode. In hardware acceleration mode, the engine can cooperate with a hardware block that performs the inverse quantization operations. In the hardware assist mode, the engine can cooperate with a host CPU for accelerating variable length decoding portions of a processing chain.

[3] See, "Parallel Multiple-Symbol Variable-Length Decoding" by Jari Nikara et al. Proceedings of the 2002 IEEE International Conference on Computer Design.
[4] Motion Pictures Expert Group Standards can be found at http://www.chiariglione.org/mpeg/standards.htm. AAC and JPEG standards published by the International Organization for Standards at http://www.iso.org.

As described in the present application a VLD pipeline can be separated into bit field extraction and decoding process. A bit field extraction process is described for extracting bit fields of specified length from memory, updating bit offsets, loading new data from memory when needed and so on. A decoding process is described for uniquely identifying the VLD field, given the bit field of certain length that is typically the maximum possible bit length.

A configurable bitstream decoding engine is described in the present application that can be configured to decode bitstreams encoded using any of a plurality of coding schemes. Functional components of a bitstream engine can be disabled, enabled and configured as necessitated by the encoding scheme used to encode a bitstream. Functional components of a bitstream engine can perform single actions and operations, repetitive actions and operations and sequences of actions and operations as desired.

A configurable bitstream decoding engine is described that can be configured to decode bitstreams encoded using new or altered encoding schemes. The configurable bitstream decoding engine may be configured by various means including by a local controlling processor, by information extracted from the bitstream and by a controlling processor in response to information extracted from the bitstream.

A configurable bitstream decoding engine is described that can be configured to decode bitstreams using Huffman decode tables. The Huffman decode tables may be provided as multi-level decode tables. In certain embodiments, the configurable bitstream decoding engine can use downloadable decode tables, including tables extracted from the bitstreams.

BRIEF DESCRIPTION OF THE DRAWINGS

The present invention is illustrated by way of example, and not limitation, in the figures of the accompanying drawings in which like references denote similar elements, and in which.

DETAILED DESCRIPTION OF THE INVENTION

The present invention will now be described in detail with reference to the drawings, which are provided as illustrative examples of the invention so as to enable those skilled in the art to practice the invention. Notably, the figures and examples below are not meant to limit the scope of the present invention. Where certain elements of the present invention can be partially or fully implemented using known components, only those portions of such known components that are necessary for an understanding of the present invention will be described, and detailed descriptions of other portions of such known components will be omitted so as not to obscure the invention. Further, the present invention encompasses present and future known equivalents to the known components referred to herein by way of illustration.

Figure 1:
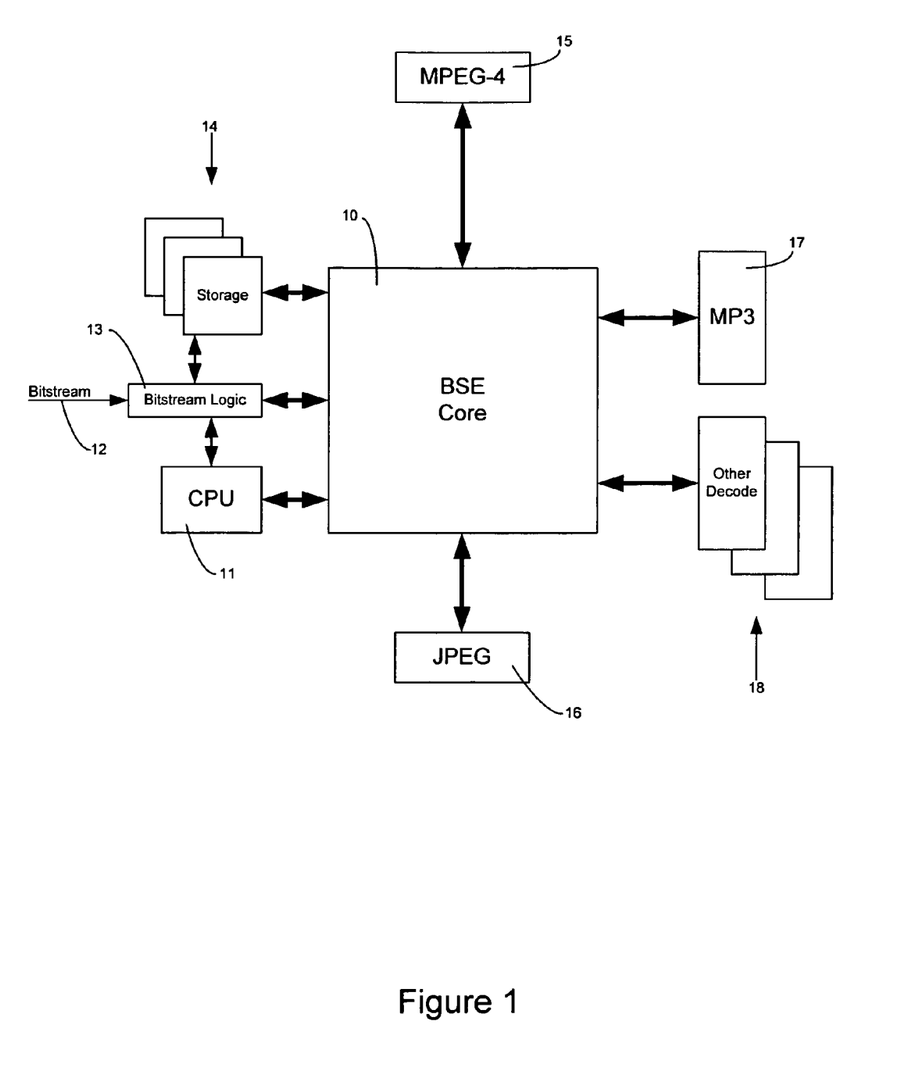
FIG. 1 illustrates one example of a configurable system for decoding multi-format data streams.

The block drawing in FIG. 1 describes, in general form, an example of a system consistent with certain embodiments of the invention': In the example a bitstream engine ("BSE") 10 forms the core of a multiformat decoding system. Typically, BSE 10 can be configured to perform selected operations associated with the decoding of bitstream 12. Bitstream 12 may be encoded using any of a plurality of encoding systems including, for example, MPEG-1, MPEG-2, MPEG-3, MPEG-4, WMV9, 11.264, JPEG, AAC, WMA and other encoding schemes.

In certain embodiments, bitstream logic 13 may be provided that receives and preprocesses bitstream 12. Bitstream logic 13 typically can be configured to process and remove synchronization information, bitstream identification and other control portions of bitstream 12. Bitstream logic 13 may also be configured to reformat information in bitstream 12 whereby, for example, portions of the information may be aligned on selectable bit, byte or word boundaries and bit order may be adapted according to a preferred endian mode. Additionally, bitstream logic 13 can, in certain embodiments, demultiplex a bitstream or separate functional components of bitstream 12. In many embodiments, bitstream logic 13 can provide bitstream-specific configuration information required for decode including decode tables, partial decode tables, supplementary decode tables, table index sizes, Escape codes, special codes (such as error, termination and synchronization codes), sign bit configuration and run detect information.

Typically, bitstream logic 13 interacts with a processor 11 that can be any suitable microprocessor, microcontroller, digital signal processor ("DSP"), state machine or custom logic. In one example, bitstream logic may be controlled by a combination of one or more ARM processors and one or more DSPs. Upon processing of bitstream 12, preprocessed information can be placed in a bitstream buffer that can be a register set, system storage or custom logic adapted to receive sequential bitstream information.

In certain embodiments, processor 11 can configure one or more decode components 15-18 according to the encoding scheme applied to bitstream 12. Processor 11 and decode components 15-18 can configure and command BSE 10 to process portions of bitstream 12. Configuration may be achieved in certain embodiments through issuance of configuration commands. Command scripting is typically supported by BSE 10 whereby a sequence of commands can be defined or one-time, repetitive or looped execution. In certain embodiments, BSE 10 enables decision making to control the flow of control within the command script. Thus, in many embodiments it is possible to program BSE 10. Based in part on the encoding scheme, a decode component may operate independently of processor 11 providing an output representing decoded information extracted from bitstream 12. In at least some embodiments, processor 11 may participate in the decoding of portions of bitstream 12. Thus, BSE 10 can provide hardware acceleration and hardware assistance as needed.

In certain embodiments, BSE 10 can be configured for Huffman decoding of variable length symbols. BSE 10 can employ methods and systems described in related U.S. patent application Ser. No. 11/293,708 (filed Dec. 1, 2005 and entitled EFFICIENT DECODING OF N-TUPLE VARIABLE BIT LENGTH SYMBOLS) for efficiently decoding bitstreams. Various factors influence the configuration of BSE 10. For example, MP3 and AAC Audio coding specification provides variable length bit field that can represent values for 1, 2 or 4 consecutive samples. For convenience, such groups of symbols will be referred to as 2-tuple, 4-tuple and n-tuple, where "n" signifies the number of symbols encoded. MP3 or AAC audio encoders may choose to adaptively use a Huffman Table that is appropriate for 2-tuple or 4-tuple fields. The choice of which table is chosen is sent as a side information that is embedded in the MP3/AAC bitstream and BSE 10 can be configured accordingly. Additionally, individual sample values in a 2-tuple or a 4-tuple may be signed values. When signed values are to be encoded, the magnitude of these 2-tuple/4-tuple fields are first encoded using the appropriate Huffman Tables followed by their sign-bits. BSE 10 can be configured to extract fixed and variable numbers of sign bits from bitstream 12.

Figure 2:
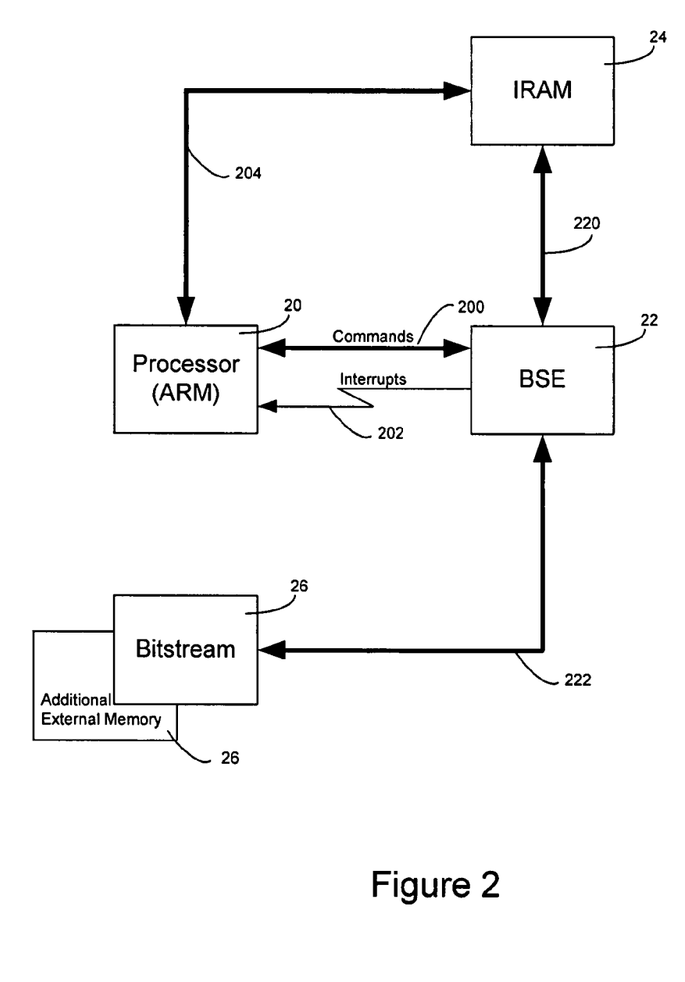
FIG. 2 illustrates command flow in the example of FIG. 1.

Referring to FIG. 2, in certain embodiments of the invention a BSE 22 is provided that can facilitate decoding of bitstreams in various formats. In some embodiments, BSE 22 can be adapted such that it can operate as a hardware accelerator that can receive a bitstream and provide a decoded output. In one example of a hardware accelerator, BSE 22 can be adapted to operate as a configurable decoder for AAC bitstream decoding. In some embodiments, BSE 22 can be adapted to operate in conjunction with a processor 20 such that the BSE 22 provides hardware assistance in decoding bitstreams encoded in any of a plurality of formats.

In one example, BSE 22 can be configured to process one or more sequences commands stored in instruction storage 24. Instruction storage 24 can be a random access memory, ROM, a plurality of registers or any combination of storage devices. Typically, instruction storage 24 is populated by processor 20 based on information including system configuration information, bitstream encoding format, information received from BSE 22 and other information associated with decoding of a bitstream.

It will be appreciated that, in certain embodiments, hardware acceleration modes of operation can be achieved by providing a complete algorithm in instruction storage 24. In some embodiments, instruction storage 24 maintains one or more command scripts provided by processor 20, wherein the command scripts can be executed until exhausted. In many embodiments, processor 20 can continually add commands to a command script as decoding progresses.

In certain embodiments, an instruction path 220 between BSE 220 and instruction storage 24 operates bidirectionally such that BSE 22 can configure an algorithm for decoding a received bitstream. In some embodiments, processor 20 may configure BSE 22 directly using a command path 200. In one example, command path 200 comprises a communication link by which coded instructions and commands may be received and interpreted by logic associated with BSE 10. In another example, command path 200 includes registers that can be directly addressed and configured by processor 20. Many embodiments define a plurality of configuration commands that can be used to configure control parameters to index information and define locations of information used in decoding bitstream 26. For example, configuration commands typically configure table sizes, prefetch size, pointers to bitstream storage 26 and pointers to instruction memory 24. Configuration settings will be discussed in more detail below.

BSE 22 and processor 20 typically operate on a buffer 26 that maintains bit sequences extracted from the bitstream. One or more pointers may be maintained in the BSE 22 and processor 20 for tracking current decode position, current prefetch position, and so on. The buffer 26 may be any suitable storage that can be accessed by processor 20 and BSE 22. In some embodiments, access to buffer 26 is controlled by BSE 22 or processor 20. In other embodiments, BSE 22 and processor 20 may have independent access to buffer 26 and responsibility for prefetching bitstream data and maintenance of pointers associated with the buffer 26 and bitstream can be assigned as appropriate based on the format of a current bitstream.

Figure 3:
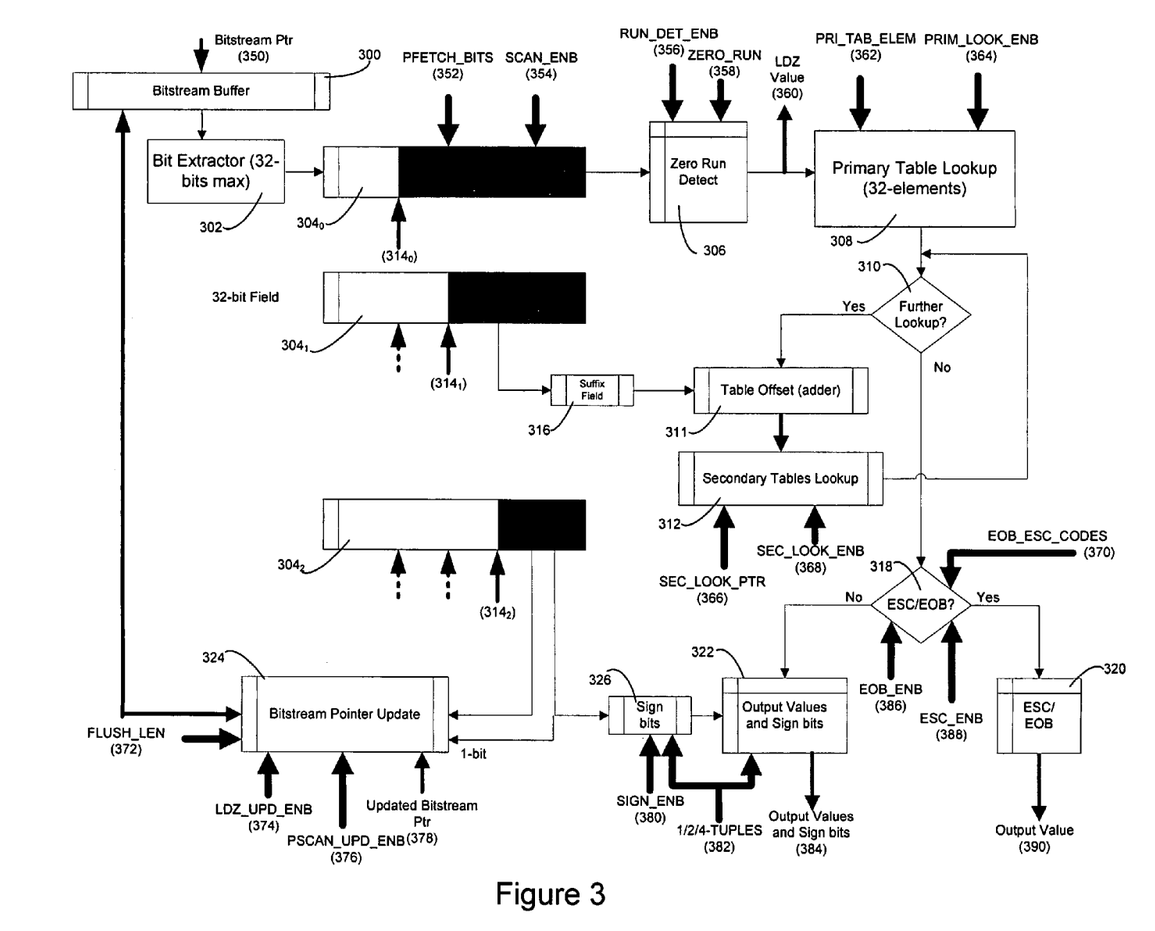
FIG. 3 is a block diagram of an embodiment of a multiformat bitstream engine.

Referring now also to FIG. 3, an example of a BSE 22 is depicted. In the example, bitstream buffer 300 receives a sequence of bits from an encoded bitstream. Typically, a bitstream pointer is provided to indicate the location in buffer 300 at which a next bit can be retrieved. In some embodiments a bit extractor 302 may be included to extract a desired number of prefetch bits 352 from buffer 300. These prefetch bits are typically next-in-sequence bits in the received encoded bitstream. The desired number of prefetch bits 352 can be configured by processor 20 and is often derived from configuration information associated with an encoding scheme used to encode the received bitstream. The number of bits retrieved by the bit extractor 302 may be less that the desired number of prefetch bits 352. Fewer bits may be retrieved where plural lookup tables are employed with at least some tables having different sized indices from other tables and certain bits from a prefetch may be unused after lookup. Further, in some embodiments, the bit extractor 302 may retrieve a fixed number of bits, typically corresponding with a byte or word boundary or with a system determined maximum prefetch size. Where unused bits are available, the next prefetch can be augmented by an appropriate number of bits from the encoded bitstream.

In certain embodiments, bit extractor 302 may provide prefetch bits to a prefetch register (depicted at different temporal states as $304_0$-$304_2$). The prefetch bits may be preprocessed as necessary for the encoding scheme of the encoded bitstream. For example, in some encoding systems, codes are prefixed with predetermined sequences of ones and zeroes such as a number of leading zeroes or a number of leading ones. A zero run detector 306 may be configured to identify and quantify the leading bit sequences. In some encoding schemes the number of leading '0's (or leading '1's) can be limited to a selected maximum number and zero run detector 306 may be configured to remove the leading bits. In some decoding schemes an all zero prefetch is illegal and zero run detector 306 can be configured to flag such illegal combinations of bits.

Consider the example of a code table in Table 1, in which each codeword includes a variable length code prefix followed by a fixed-code length suffix. The length of the suffix can be determined from the variable length prefix itself. In this example, the number of zero-runs determines the length of the suffix codeword.

TABLE 1

| | Exponential Golomb Code | | |
|---|---|---|---|
| Output Index | Output Value | Variable Length Code | Bit Length |
| 0 | 0 | 1 | 2 |
| 1 | 1 | 010 | 3 |
| 2 | −1 | 011 | 3 |
| 3 | 2 | 00100 | 5 |
| 4 | −2 | 00101 | 5 |
| 5 | 3 | 00110 | 5 |
| 6 | −3 | 00111 | 5 |
| 7 | 4 | 0001000 | 7 |
| 8 | −4 | 0001001 | 7 |
| 9 | 5 | 0001010 | 7 |
| 10 | −5 | 0001011 | 7 |
| 11 | 6 | 0001100 | 7 |
| 12 | −6 | 0001101 | 7 |
| 13 | 7 | 0001110 | 7 |
| 14 | −7 | 0001111 | 7 |

Having processed the prefetch bits as needed, a predetermined number of bits can be used as an index to a primary table using primary table lookup logic 308. Examples of primary table lookup are described in related U.S. patent application Ser. No. 11/293,708, filed Dec. 1, 2005, and entitled "EFFICIENT DECODING OF N-TUPLE VARIABLE BIT LENGTH SYMBOLS," which application is incorporated herein by reference. The number of bits required to index the primary table is typically determined by a decoding scheme implemented for the encoded bitstream. In certain embodiments, data retrieved by indexing the primary table may indicate that a second lookup is required. Where a second lookup is required, bit extractor 302 provides additional prefetch bits as required. The bitstream pointer is typically updated by pointer update logic 324 based on various factors including encoding scheme used, number of leading zeroes, number of prefetch bits used in prior lookups and information received from primary lookup table 308. In some embodiments, update of the bitstream pointer may be delayed until decode of a current symbol is completed.

In certain embodiments, when the data retrieved from the primary table indicates a secondary lookup is required, then an offset to one of one or more secondary tables may be provided in the retrieved data. Lookup of secondary tables is typically effected using secondary table lookup logic 312 to select a secondary table and to build an index to the selected secondary table. In many embodiments, the index to the secondary table is generated by offset logic 310 that can combine information from the primary table with additional prefetched bits provided as a suffix field 316. In some embodiments, a plurality of levels of lookup table can be implemented, and table lookup logic 312, offset logic 310 and suffix 310 can be used to generate corresponding indices and offsets as necessary.

Referring to FIGS. 1 and 3, certain embodiments include additional logic for performing one or more functions after a portion of the bitstream is decoded or upon detection of an error or control information such as a termination or end of block condition. In many embodiments, error detection and control information may be detected as bit sequences in the encoded bitstream. Further, in some embodiments, one or more decoded symbols may be recognized as an Escape code.

Some of the Huffman tables require Escape code handling for certain selected symbols. Escape codes are typically used to encode symbols that have a low probability of occurring. An Escape code may be detected in any value encoded in an N-tuple code and, in conventional decoding systems, the Escape code may be defined based on media standards for encoding.

In many embodiments, a BSE can detect Escape codes through comparison with one or more preconfigured Escape values 370. Upon detection, and based upon configuration settings 388, the BSE may invoke the processor 11 or submit the detected Escape code to Escape handling logic 318 for resolving the escape symbols. Escape logic 318 can be configured based on configuration settings 388 and, in at least some embodiments, escape logic 318 can have one or more predefined configurations. In many embodiments, bitstream logic 13 can provide bitstream specific configuration information used for identifying Escape codes and lookup tables. In at least some embodiments, lookup tables can be configured by processor 11 as desired. Thus performance of Escape code handling can be optimized for each bitstream, although standardized Escape code sequences and special Escape lookup tables may be implemented as desired. Certain embodiments provide "hard-wired" Escape handling for existing standards and configurable Escape handling for new media standards.

Specific examples of Escape handling methods that can be implemented by the BSE are described in related concurrently filed U.S. patent application Ser. No. 11/392,096, entitled "Method And System For Decoding N-Tuple Variable Length Code." In some embodiments, flexible and efficient ways are provided for handling escape symbols during decoding of N-tuple variable length codes (VLCs). For example, Huffman lookup tables can contain an entry to notify the decoder if a given N-tuple VLC includes an escape symbol enabling the decoder to refer decoding to a user (processor) or use pre-defined logic to resolve the escape symbols.

In many embodiments, Escape codes can be processed using processor 11. In one embodiment, processor 11 receives Escape codes from the BSE 10 and returns decoded symbols or commands. The BSE 10 can be configured to provide Escape codes in any of a plurality of mode. For example, in one mode, BSE 10 provides one or more Escape codes, halts at least some bitstream processing and waits for decoded symbols from processor 11 before resuming full operation. In another mode, BSE 10 delivers one or more Escape codes to processor 11 using a first queue and resumes processing. Processor 11 typically decodes the one or more Escape codes in the sequence in which they were delivered and provides decoded output symbols for reinsertion in the decoded output. In one example, first queue identifies a storage location containing an Escape code for processing and a location at storage where decoded output may be stored. In some Embodiments, queues may not be needed if the processor 11 has sufficient capacity to handle Escape codes as they arrive without significantly affecting system performance. In some embodiments, interrupts can be employed to control flow of codes and symbols between BSE and processor 11. For example, BSE can initiate an interrupt upon delivering an Escape code to the first queue. Alternatively, a buffer may be configured to receive an Escape code and generate interrupt to processor 11 based on buffer space usage.

In certain embodiments, sign extraction logic 322 can be configured to extract sign information from the bitstream or from information in decode tables. Sign extraction logic 322 can, for example, extract a number of bits from prefetch register 304 or from the bitstream buffer 300 using bit extractor 302. It will be appreciated that the number of sign bits required is dependent on the characteristics of encoding schemes and that the number may depend on the number of symbols encoded using a single code (i.e. n-tuple codes) in the bitstream.

In certain embodiments, output values may be formatted using output logic 322. Output logic 322 typically provides output values together with sign information consistent with encoding scheme used to encode the bitstream. In some embodiments, decoded symbols may be combined with sign information to produce a signed value in a format useable by the processor 11. For example, decoded symbols may be retrieved from lookup tables as 7 bit unsigned integer values and may be converted by output logic to double precision signed values.

Figure 4:
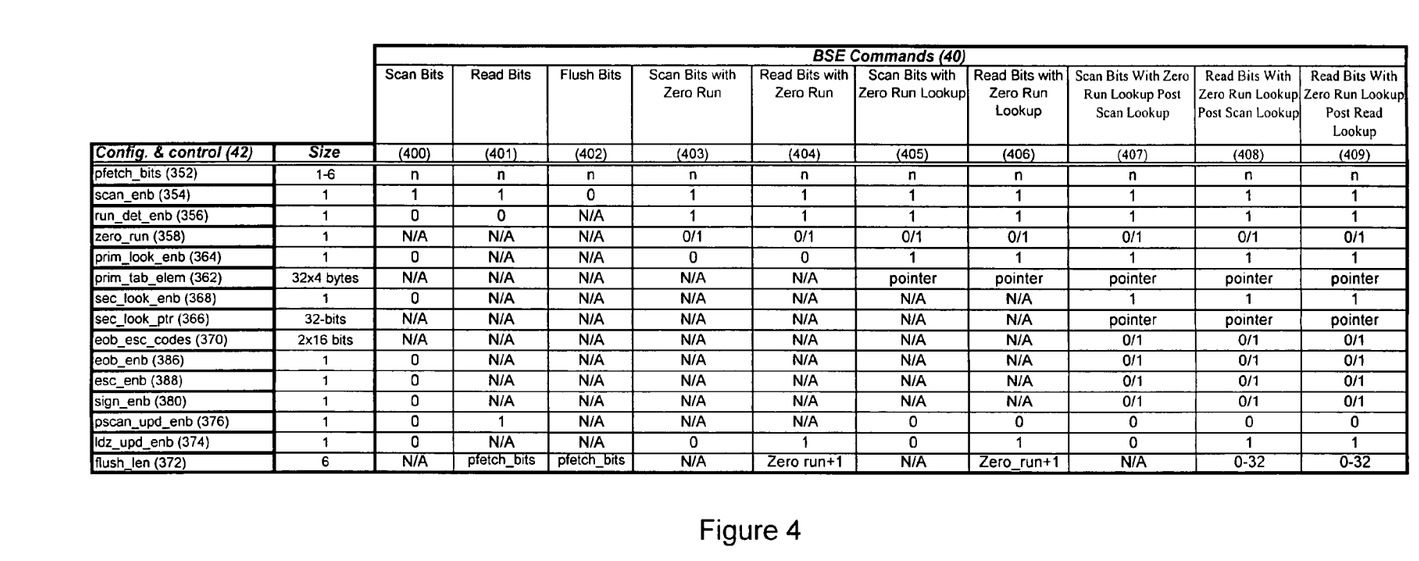
FIG. 4 is a table associating bitstream engine commands with control settings in one example of a multiformat bitstream engine.

Referring now to FIGS. 1, 3 and 4, certain embodiments comprise a highly configurable BSE 10 which can be controlled using a plurality of operating commands 40. In some embodiments, a plurality of operating commands 40 is defined that can be mapped to configuration information 42. Configuration information 42 is typically used to configure elements of BSE 22 based on operations selected to be performed, as well as the encoding scheme used to encode bitstream 12. Configuration information 42 may include control signals that enable or disable functionality of one or more components in BSE 22, pointers that identify locations in storage for storing or retrieving data associated with bitstream decoding, pointers that identify locations in storage in which instructions and instruction scripts are maintained and other parameters that control, monitor and report bitstream decoding operations.

In many embodiments, a command language may be used to automate the generation of configuration information. Commonly used commands 40 can be defined that configure BSE 10 to perform desired operations. The table of FIG. 4 shows an example of associations between commands 40 and configuration and control information 42. It will be appreciated that certain of the commands may require one or more input parameters that provide necessary configuration values including, for example, a command that configures the number of prefetch bits required to index a primary table. In certain embodiments, sequences of commands may be predefined, typically in script form. In some embodiments, processor 11 can create or modify command sequences. BSE 10 may optionally include a script management component that enables algorithmic programming of BSE 10 by processing script control commands such branch, jump, begin and end.

In many embodiments, certain components of BSE 10 comprise sequencing logic and state machines and can perform sequences of operations upon receipt of relatively few commands. For example, a Get_Multiple command could be defined that decodes a desired number of codes from bitstream 12, requiring multiple cycles of bit prefetch and decode operations. In some embodiments, processing and scheduling of commands may be provided using processor 11 or other device capable of executing sequences of commands. For example, a microprocessor or digital signal processor can be provided for control of the BSE 10 and communication with other external systems.

Typical use of configuration information 42 can be appreciated through consideration of the example of a BSE 10 in FIG. 3 (and outlined in FIG. 1). In the example, a bitstream pointer 350 identifies a current position in bitstream buffer 300. Bitstream pointer 350 typically identifies a next location in bitstream buffer 300 at which the next bit for decoding can be found. In certain embodiments, the location identifies a byte, word, long word or other unit of data which contains the next bit to be loaded into bit extractor 302. Bitstream pointer 350 is typically initialized using a configuration command.

In certain embodiments, bit extractor 302 is provided to retrieve from bitstream buffer 300 a selected number of bits for decoding. Bit extractor operates to populate prefetch register 304 undecoded bits extracted from bitstream buffer 300. As will be discussed later, prefetch register may contain a number of undecoded bits within a predetermined range where the range is determined by BSE configuration, prefetch register 304 size and operation, memory width and endianness and other factors including capabilities of instruction set of processors used in the system.

In certain embodiments, a minimum number of prefetch bits required for decoding operations can be configured using PFETCH_BITS 352. PFETCH_BITS 352 is typically selected to identify the minimum number of bits required to index a lookup table, retrieve a number of sign bits, a number of bits needed to handle an Escape code or a number of bits needed to be extracted from the bitstream for other reasons, including error handling, and so on. In certain embodiments, multiple levels of lookup tables are implemented, wherein certain of the tables have larger sizes than other tables. Where different sized lookup tables are provided, size information in addition to PFETCH_BITS 352 may be provided. For example, a first level table may identify a number prefetch bits required to look up a second level table. In another example, sign bit extraction 326 may identify a quantity of sign bits to be extracted from the datastream. In another example, Escape decode logic may identify a number of bits to be prefetched for Escape decoding. Identification of a number of bits for prefetch can be accomplished using offset values to PFETCH_BITS 352, replacement values for PFETCH_BITS 352, multiple prefetches of PFETCH_BITS 352 sized units of bits until sufficient bits have been retrieved, or through any other suitable mechanism.

PFETCH_BITS 352 can identify a number of bits that are to be scanned or read. In certain embodiments separate scanning and reading operations are provided such that a scan operation may cause bits to be prefetched from bitstream buffer 300 without immediate update of bitstream pointer 350 and a read causes bits to be prefetched with an immediate corresponding update of bitstream pointer 350. In certain embodiments, bitstream pointer can be updated after part all of a decode involving one or more scans. For example, a scan may return a number n of bits from bitstream buffer 300, of which bits are needed to decode next symbols, where i<n. Upon completion of decoding one or more symbols, bitstream pointer 350 can be updated by i bytes, effectively "returning" n-i bytes to bitstream buffer 300 for use in decoding subsequent symbols. Typically, configuration information SCAN_ENB 354 enables bit extraction by bit extractor 302 from bitstream buffer 300.

Continuing with the example depicted in FIG. 3, bitstream pointer update logic 324 can be implemented to receive control signals and provide an updated bitstream pointer 378. Control signals may include LDZ_UPD_ENB 374 for indicating load operation type update, PSCAN_UPD_ENB 376 for enabling post-scan operation updating of bitstream pointer 350 and FLUSH_LEN 372 for updating bitstream pointer 350 such that a selected number of bits may be flushed or discarded. Bits are typically flushed in response to detection of certain conditions during decoding, such as detection of "filler," leading or trailing bits, detection of error conditions requiring discard of a block of bits and system or user initiated termination of decoding.

In certain embodiments, bits extracted from bitstream buffer 300 by bit extractor 302 can be maintained in prefetch register 304. In some embodiments, the bits are shifted into prefetch register 304 and contents of prefetch register 304 may be shifted right or left prior to merging bits from bit extractor 302. In many embodiments, bits are prefetched in fixed lengths determined by factors including PFETCH_BITS 352 setting and system architecture.

In many embodiments, prefetch register 304 can be used to supply bits for multiple steps of symbol decoding without need for additional prefetching bits from bitstream buffer 300. For illustrative purposes, FIG. 3 depicts prefetch register 304 as having sequential time states indicated as $304_0$, $304_1$ and $304_2$ and an associated current bit position $314_0$, $314_1$ and $314_2$. A first table lookup may be performed using bits initially present in prefetch register $304_0$ starting at bit position $304_0$. Next, a second table lookup can be performed using bits in prefetch register $304_1$ (representing new bit condition) at new starting position $314_1$, where $314_1$ is adjusted to account for the number of bits exhausted in first table lookup. Third table lookup may use modified prefetch register $304_2$ and so on. It will be appreciated that bitstream pointer update logic 324 may be configured to monitor current bit position in prefetch register 300 to determine when additional bits should be prefetched. Similarly, bit prefetch may be initiated by sign decode logic 326 and escape/end of block processing logic 320 as necessary.

In certain embodiments, a BSE can be adapted to process encoded bitstreams that include run length encoding. Zero run detect logic 306 can be enabled using RUN_DET_ENB 356 and ZERO_RUN 358 configuration bits. ZERO_RUN 358 configuration bits may be used to specify the number and value of leading bits. Zero run detect logic 306 may provide an output representing decoded information as LDZ Value 360.

In certain embodiments, lookup tables 308 and 312 can be configured based on formats of bitstreams to be decoded. Structure of lookup tables can be configured by, for example, using PRI_TAB_ELEM 362 for specifying cell format of primary table 308. PRI_TAB_ELEM 362 inherently defines size of pointer required to index primary table. Where, for example, PRI_TAB_ELEM 362 indicates that primary table is structured as 32×4 bytes, then it will be appreciated that a 5 bit pointer is required to index such table. Likewise, secondary tables 312 may be individually defined by corresponding SEC_LOOK_PTR 366 values. In many embodiments, location of secondary tables 312 is provided in certain cells of primary table 308 as an offset from primary table 308. Thus, when a secondary table lookup is indicated at 310, the value of a cell indexed in primary table 308 may include an offset locating a desired secondary table 312. Offset processing may be handled by offset logic 311 which may combine a suffix field 316 extracted from the bitstream with an offset provided from a cell in primary table 308. For example, tables can be arranged in near proximity to one another such that indices to the secondary tables may be formed using offset logic 311 to add suffix and offset.

In FIG. 4, the relationship of some BSE commands 40 to configuration and control signals 42 is shown based on the example BSE 10 of FIGS. 1 and 3. Commands 40 can be constructed that set or reset bits in selected control and configuration information thereby enabling, disabling or configuring operation of components in the BSE 10. For example, a Scan_Bits command 400 may enable bit extraction by setting SCAN_ENB 354 and disable pointer update 324 by clearing PSCAN_UPD_ENB 376, whereas a Read_Bits command 401 may enable bit extraction by setting SCAN_ENB 354 and also enable pointer update 324 by setting PSCAN_UPD_ENB 376. In another example, the Read_Bits command 401 typically differs from Flush_Bits command 402 in the value of SCAN_ENB 354. In the latter example, both commands can also pass a FLUSH_LEN parameter 372 that specifies a number by which bitstream pointer 350 should be advanced.

In certain embodiments, configuration signals 42 may comprise a plurality of individual signals. For example, in one example, PFETCH_BITS 352 is configured as a counter to indicate a number of bits to be prefetched. In this example, PFETCH_BITS 352 typically comprises between one and six bits. In some embodiments, information regarding table size may be maintained in PRIM_TAB_ELEM 362 variables and one or more table pointer values such as SEC_LOOK_PTR 366. Additional tabulated information may be configured in information such as EOB_ESC_CODES 370. The size and structure of variables for maintaining table information and pointers is typically determined by processor capabilities and the specific design of individual BSE components. For example, a BSE may provide a single register for defining multiple control elements and may provide access for setting individual bits in the register. In some embodiments, all bits in a register must be configured simultaneously.

In many embodiments, many commands 40 may provide a minimum number of prefetch bits (PFETCH_BITS 352) that will be required to execute the command 40. The value provided as PFETCH_BITS 352 may cause a prefetch by bit extractor 302 where insufficient bits are discovered in prefetch register 304. It will be appreciated that certain commands, such as Flush_Bits 402, may disable bit extractor 302 by clearing SCAN_ENB 354.

In many embodiments, FLUSH_LEN 472 can be used to flush prefetch register 304. For some commands 40, flushing occurs after completion of a commanded operation. In other commands 40, flushing can occur immediately upon extraction of bits from prefetch register 304. Flushing typically includes updating bit pointer 314. In some embodiments, the number of bits remaining in prefetch register 304 is compared to PFETCH_BITS 352 and, where insufficient bits remain in prefetch register 304, additional bits may be fetched from bitstream buffer 350. In at least some embodiments, bits may be shifted or otherwise moved within prefetch register 304 prior to prefetching additional bits.

Certain similar commands may be implemented that differ by enablement status of one or more BSE functional elements. For example, a Read_Bits_with_Zero_Run_Lookup command 406 may perform all of the operations of a Read_Bits command 401 and also include zero run detection using zero run detect logic 306. In this latter example, command 406 typically configures control signals including ZERO_RUN 358 and LDZ_UPD_ENB 374.

From these examples, it can be appreciated that a plurality of commands 40 can be developed that enables the BSE 10 to be controlled by script and program. Various methods of mapping commands 40 and command parameters to c configuration and control signals 42 may be employed with desired effect. These methods include assigning bits in a command word to individual or groups of configuration and control signals 42. For example, a portion of a command word may be mapped to a bit pattern used to configure a group of the configuration and control signals 42.

Bit Field Extraction

Figure 5A:
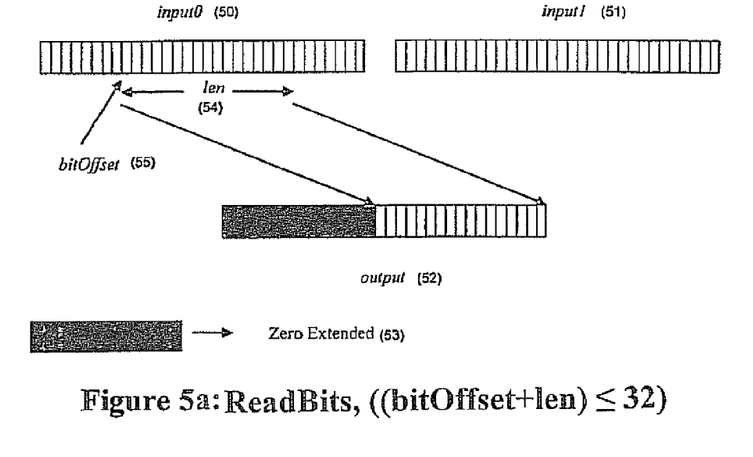
FIGS. 5a and 5b illustrate prefetching in one example of a multiformat bitstream engine.
Figure 5B:
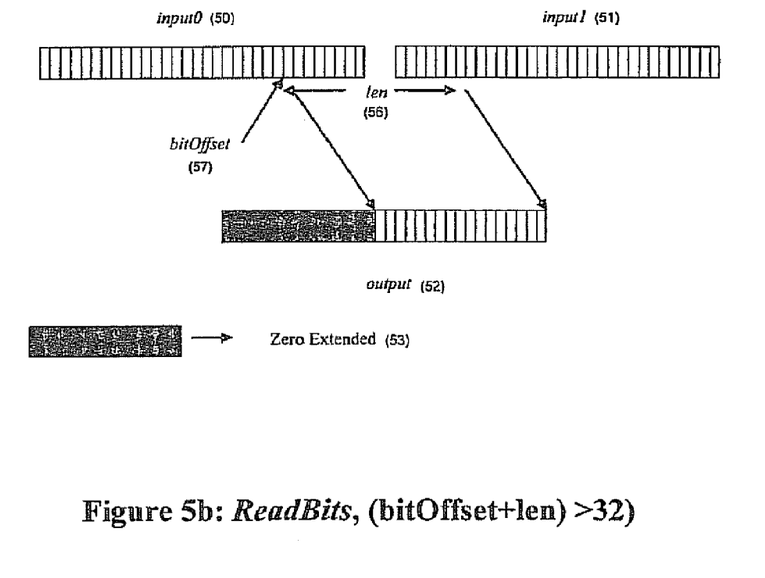

Referring to FIGS. 3 and 5a-b, in certain embodiments, pipelining techniques may be used for decoding bitstreams that implement variable length encoding schemes. For example, pipeline functions can be separated into bit field extraction and a bit field decoding process such as a Huffman decoding process. Bit field extraction may be implemented to extract bit fields of specified length from memory, to update bit offsets, to load new data from memory when needed and other such operations. The examples provided below illustrate a process that uniquely identifies a VLD field given the bit field of certain length (usually, this length is the maximum possible bit length).

In certain embodiments, bit field extraction can be used to extract bit fields of specified length from memory. In the example depicted in FIGS. 5a and 5b, two consecutive 32-bit registers 50 and 51 maintain bits extracted sequentially a bitstream. It will be appreciated that various storage elements can also be used to maintain bits extracted from the bitstream. For example, a 64-bit long word may be manipulated as two 32-bit long words consistent with the example of FIGS. 5a and 5b. A first pointer, bitOffset 55 or 57 identifies the bit location of the next bit to be retrieved from first register 50.

In many embodiments, first and second registers are adapted to store 32-bit unsigned integer values in big-endian format. It will be appreciated, however, that various approaches can be adopted based on system capabilities and hardware capacities. For example, in some embodiments, bitOffset 55 and 57 may be permanently set to zero and a shift operation performed after each read or scan to move the next available bit to the first bit location in a register. In some embodiments, a single register is used when the maximum number of bits that can be scanned does not exceed register size. In certain embodiments, a BSE can logically concatenate a plurality of registers to obtain a desired total register size.

In certain embodiments a command language can be defined to facilitate configuration and control of a BSE and associated components. The commands shown in FIG. 4 provide one example of a command set that can be used to control the embodiment of a BSE depicted in FIGS. 3 and 5. The command language includes the following commands:

1. ScanBits 400: a bit field of len 54 or 56 can be retrieved from first register 50 or from first and second registers 50 and 51 commencing at a bit position indicated by bitOffset 55 or 57 respectively. In the example depicted in FIG. 5b, len 54 bits may not be available in first register 50, in which case one or more bits must be retrieved from second register 51. In the latter case, upon retrieval of the bits, the contents of second register 51 are typically shifted or otherwise moved to first register 50 and a next 32 bits can be extracted form the bitstream and placed in second register 51. Typically, scan operations dissociates bitOffset 55 or 57 update from the retrieval of bits and update may be initiated at some subsequent point in time. ScanBits 400 can be used to extract bits for use by subsequent instructions.

2. ReadBits 401: a bit field of len 54 bit can be extracted starting from a bit location identified by bitOffset 55 in first register 50. As shown in the example of FIG. 5a, all len 54 bits may be retrievable from first register 50. In the example depicted in FIG. 5b, len 54 bits may not be available in first register 50, in which case one or more bits must be retrieved from second register 51. In the latter case, upon retrieval of the bits, the contents of second register 51 are typically shifted or otherwise moved to first register 50 and a next 32 bits can be extracted form the bitstream and placed in second register 51. The value of bitOffset 55 or 57 may then be adjusted to indicate the location of the next bit to be retrieved. ReadBits 401 can be used to extract bits for use by subsequent instructions.

3. FlushBits 402: len 54 or 56 bits may be effectively flushed by adding value len 56 to bitOffset 55 or 57. In the example depicted in FIG. 5*b*, such addition causes bitOffset 55 to move beyond first register 50, thereby contents of second register 52 should be moved to first register 50 in the manner described above for ScanBits 400 and ReadBits 401 and, in some cases, indicating that one or more bits need also be flushed from first register 50.
4. ScanBits with Zero Run ("SZR") 403: In addition to the actions enabled by ScanBits 400, SZR 403 includes enablement of run detect logic 306. Typically, RUN_DET_ENB 356 enables run detect logic 306 and ZERO_RUN 358 is used to select leading ones or leading zeroes.
5. ScanBits with Zero Run Lookup (SZRL) 405: In addition to the actions enabled by SZR 403, SZRL 405 includes enablement of primary table lookup using PRIM_LOOK_ENB 364. Additionally, PRIM_TAB_ELEM 382 may be configured to identify a primary table and, in some embodiments, primary table configuration.
6. ScanBits with Zero Run Lookup Post Scan Lookup (SZRLP) 407: In addition to the actions enabled by SZRL 405, SZRLP 407 includes enablement of secondary lookup using SEC_LOOK_ENB 368. SZRLP 407 can be used to identify a secondary table and configuration using SEC_LOOK_PTR 366 and can be further used to configure the BSE to handle Escape codes and End of block indicators 318 and 320 and sign extraction 326. Identification of Escape codes.
7. ReadBits with Zero Run ("RZR") 404: In addition to the actions enabled by ReadBits 401, RZR 404 includes enablement of run detect logic 306. Typically, RUN_DET_ENB 356 enables run detect logic 306 and ZERO_RUN 358 is used to select leading ones or leading zeroes.
8. ReadBits with Zero Run Lookup (RZRL) 406: In addition to the actions enabled by RZR 404, RZRL 406 includes enablement of primary table lookup using PRIM_LOOK_ENB 364. Additionally, PRIM_TAB_ELEM 382 may be configured to identify a primary table and, in some embodiments, primary table configuration.
9. ReadBits with Zero Run Lookup Post Scan Lookup (RZRLPS) 408: In addition to the actions enabled by SZRL 405, RZRLPS 408 includes enablement of secondary lookup using SEC_LOOK_ENB 368. RZRLPS 408 can be used to identify a secondary table and configuration using SEC_LOOK_PTR 366 and can be further used to configure the BSE to handle Escape codes and End of block indicators 318 and 320 and sign extraction 326. Identification of Escape codes.
10. ReadBits with Zero Run Lookup Post Read Lookup (RZRLPR) 409: In addition to the actions enabled by RZRL 406, RZRLPR 409 includes enablement of secondary lookup using SEC_LOOK_ENB 368. RZRLPR 409 can be used to identify a secondary table and configuration using SEC_LOOK_PTR 366 and can be further used to configure the BSE to handle Escape codes and End of block indicators 318 and 320 and sign extraction 326. Identification of Escape codes.

This command set provides commands that can be used to configure a BSE for decoding bitstreams encoded using a wide variety of encoding schemes. In certain embodiments, the command set may be expanded to include more specifically defined commands. More specifically designed commands may identify one or more predefined decode tables in a BSE using a reference. For example, a subset of commands could be defined as RZRLPR_1, RZRLPR_2 and so on, where the each RZRLPR command implicitly selects between predefined lookup table set 1 or 2.

Figure 6:
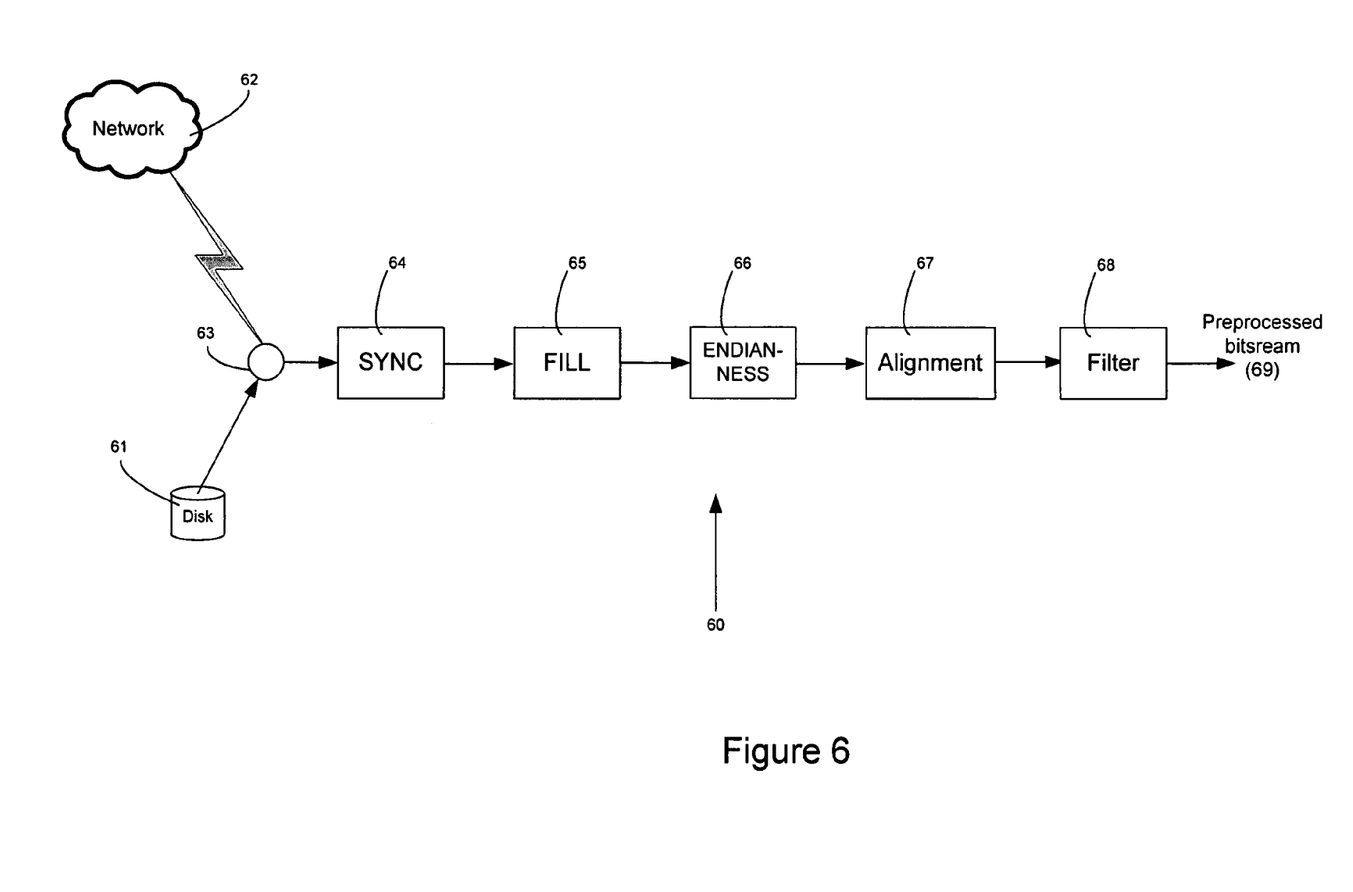
FIG. 6 illustrates bitstream preprocessing in one example of a multiformat bitstream engine.

Referring now to FIG. 6, in many embodiments a bitstream can be preprocessed prior to populating a bitstream buffer. A preprocessor, indicated generally at 60, typically performs a plurality of functions including processing synchronization data, extracting "filler" data from the bitstream, conforming endian-ness of data in the bitstream buffer and aligning data blocks as necessary. In certain embodiments preprocessor 60 receives a raw datastream from an interface device 63 which may be adapted to receive data from a data network 62 or physical media 61 such as DVD or CD. Preprocessor 60 components typically output data to some combination of storage, including contiguous memory, chained blocks of storage, system provided buffers and a queuing mechanism such as a pipeline or first-in-first out register system.

In certain embodiments, synchronization data is identified and processed by synchronizer 64. Synchronization data may be used to delimit blocks of encoded data, initiate, terminate or control playback of a discrete element, program or chapter. Synchronization data may also include encoding information indicating a type of encoding scheme used to encode the bitstream. In certain embodiments, decode tables can be selected based on the encoding information. In at least some embodiments, encoding information may include portions of decoding tables used to decode symbols from the encoded bitstream.

In certain embodiments, fill data can be extracted (block 64). Fill data typically comprises information related to sequences of unchanging data. For example, a sequence of '0's may be encoded using a special code and a count value set that can be used to insert a desired number of '0's into the decoded data stream.

In certain embodiments, conversion logic 66 comprises a combination of hardware and software for arranging received bits into a bytes or words having either little endian or big endian format. For example, interface device 63 may provide 8 bits arranged in little-endian format in buffers for processing by a big-endian processor. In this example, conversion logic 66 converts the little-endian bytes to big-endian bytes. Alignment logic 67 comprising combinations of hardware and software may be provided to group or align data at byte, word and long word boundaries.

In some embodiments, a filter 68 can be enabled for extracting information that does not require sequences of decoding operations. An example of information that can be extracted by filter 68 is "fill data" supported in certain encoding schemes whereby repeated bit patterns (such as strings of identical bits) can be represented by as a count and a symbol value. In another example, unsupported or irrelevant control information can be removed from the bitstream by filter 68. In certain embodiments, filtered information can be discarded or can bypass the BSE for insertion into the decoded information.

It is apparent that the above embodiments may be altered in many ways without departing from the scope of the invention. Further, various aspects of a particular embodiment may contain patentably subject matter without regard to other aspects of the same embodiment. Additionally, various aspects of different embodiments can be combined together. Also, those skilled in the art will understand that variations can be made in the number and arrangement of components illustrated in the above diagrams. It is intended that the appended claims include such changes and modifications.

What is claimed is:

1. A method of configuring a bitstream engine, said method comprising:
   analyzing a bitstream to determine information associated with said bitstream, wherein said information comprises an encoding scheme associated with said bitstream;
   determining at least one command based on said information; and
   configuring said bitstream engine, using said at least one command, to access said bitstream from a memory and further to decode said bitstream, wherein said at least one command is associated with configuration information comprising at least one pointer, and wherein said at least one pointer is associated with at least one instruction associated with decoding of said bitstream.

2. The method of claim 1, wherein said information comprises data selected from a group consisting of a decode table, a partial decode table, a supplementary decode table, a table index size, an escape code, an error code, a termination code, a synchronization code, a sign bit configuration, and run detect information.

3. The method of claim 1, wherein said at least one command forms a command script.

4. The method of claim 1, wherein said configuring further comprises configuring said bitstream engine to:
   access a portion of said bitstream; and
   index a table using said portion of said bitstream to obtain a result.

5. The method of claim 4, wherein said configuring further comprises configuring said bitstream engine to:
   access a second portion of said bitstream; and
   index a second table using said result and said second portion of said bitstream to obtain a second result.

6. The method of claim 4, wherein said configuring further comprises configuring said bitstream engine to:
   access sign information associated with said result.

7. The method of claim 4, wherein said configuring further comprises configuring said bitstream engine to:
   locate said portion of said bitstream in said memory using said a pointer; and
   update said pointer.

8. The method of claim 7, wherein said configuring further comprises configuring said bitstream engine to:
   update said pointer in proportion to a number of bits of said portion of said bitstream.

9. The method of claim 7, wherein said configuring further comprises configuring said bitstream engine to:
   update said pointer responsive to said access of said portion of said bitstream.

10. The method of claim 7, wherein said configuring further comprises configuring said bitstream engine to:
    update said pointer responsive to obtaining said result.

11. The method of claim 1, wherein said configuring further comprises configuring said bitstream engine to:
    process an escape sequence in said bitstream to obtain a result.

12. The method of claim 1, wherein said configuring further comprises configuring said bitstream engine to:
    detect zero run information in said bitstream.

13. A system comprising:
    a first component operable to analyze a bitstream to determine information associated with said bitstream, wherein said information comprises an encoding scheme associated with said bitstream; and
    a processor operable to:
       determine at least one command based on said information; and
       configure a bitstream engine, using said at least one command, to access said bitstream from a memory and further to decode said bitstream, wherein said at least one command is associated with configuration information comprising at least one pointer, and wherein said at least one pointer is associated with at least one instruction associated with decoding of said bitstream.

14. The system of claim 13, wherein said information comprises data selected from a group consisting of a decode table, a partial decode table, a supplementary decode table, a table index size, an escape code, an error code, a termination code, a synchronization code, a sign bit configuration, and run detect information.

15. The system of claim 13, wherein said at least one command forms a command script.

16. The system of claim 13, wherein said processor is further operable to configure said bitstream engine to:
    access a portion of said bitstream; and
    index a table using said portion of said bitstream to obtain a result.

17. The system of claim 16, wherein said processor is further operable to configure said bitstream engine to:
    access a second portion of said bitstream; and
    index a second table using said result and said second portion of said bitstream to obtain a second result.

18. The system of claim 16, wherein said processor is further operable to configure said bitstream engine to:
    access sign information associated with said result.

19. The system of claim 16, wherein said processor is further operable to configure said bitstream engine to:
    locate said portion of said bitstream in said memory using said a pointer; and
    update said pointer.

20. The system of claim 19, wherein said processor is further operable to configure said bitstream engine to:
    update said pointer in proportion to a number of bits of said portion of said bitstream.

21. The system of claim 19, wherein said processor is further operable to configure said bitstream engine to:
    update said pointer responsive to said access of said portion of said bitstream.

22. The system of claim 19, wherein said processor is further operable to configure said bitstream engine to:
    update said pointer responsive to obtaining said result.

23. The system of claim 13, wherein said processor is further operable to configure said bitstream engine to:
    process an escape sequence in said bitstream to obtain a result.

24. The system of claim 13, wherein said processor is further operable to configure said bitstream engine to:
    detect zero run information in said bitstream.

* * * * *